United States Patent
Inoue et al.

(10) Patent No.: US 8,524,339 B2
(45) Date of Patent: Sep. 3, 2013

(54) CONTAINER-ENCLOSED FULLERENE, METHOD OF MANUFACTURING THE SAME, AND METHOD OF STORING FULLERENE

(75) Inventors: Takashi Inoue, Kanonji (JP); Yuji Takimoto, Kanonji (JP)

(73) Assignee: Toyo Tanso Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/575,128

(22) PCT Filed: Feb. 16, 2011

(86) PCT No.: PCT/JP2011/053236
§ 371 (c)(1),
(2), (4) Date: Jul. 25, 2012

(87) PCT Pub. No.: WO2011/102364
PCT Pub. Date: Aug. 25, 2011

(65) Prior Publication Data
US 2012/0308748 A1  Dec. 6, 2012

(30) Foreign Application Priority Data
Feb. 22, 2010 (JP) ................ 2010-036103

(51) Int. Cl.
B29D 22/00 (2006.01)
B29D 23/00 (2006.01)
B31B 45/00 (2006.01)
B32B 1/08 (2006.01)

(52) U.S. Cl.
USPC ............ 428/34.1; 428/408; 53/432; 977/734; 977/841; 977/842

(58) Field of Classification Search
USPC ................ 977/841, 734, 842; 428/34.1, 408; 141/2; 53/432
See application file for complete search history.

(56) References Cited

U.S. PATENT DOCUMENTS
| | | | |
|---|---|---|---|
| 2005/0118202 A1 | 6/2005 | Yamashita et al. | |
| 2009/0194189 A1* | 8/2009 | Bordere et al. | 141/2 |
| 2009/0230979 A1 | 9/2009 | Omote et al. | |

FOREIGN PATENT DOCUMENTS
| | | |
|---|---|---|
| JP | 01-247486 A | 10/1989 |
| JP | 06-299181 A | 10/1994 |
| JP | 07-138009 A | 5/1995 |
| JP | 10-130531 A | 5/1998 |
| JP | 2003-246733 A | 9/2003 |
| WO | 2007/029684 A1 | 3/2007 |

OTHER PUBLICATIONS
International Search Report of PCT/JP2011/053236, mailing date of Apr. 5, 2011.

* cited by examiner

*Primary Examiner* — Michael C Miggins
(74) *Attorney, Agent, or Firm* — Westerman, Hattori, Daniels & Adrian, LLP

(57) ABSTRACT

A container-enclosed fullerene, a method of manufacturing the same, and a method of storing fullerene are provided, that make it possible to inhibit alteration of fullerene, especially that make it possible to prevent degradation of the solubility to solvent. A container-enclosed fullerene includes fullerene hermetically enclosed in a container with a high degree of vacuum. The internal pressure of the container is preferably 10 Pa or lower. The fullerene is preferably a metal encapsulated fullerene. The container-enclosed fullerene is manufactured by filling fullerene in a container, evacuating the container, and thereafter sealing the container.

6 Claims, 2 Drawing Sheets

CONTAINER-ENCLOSED FULLERENE, METHOD OF MANUFACTURING THE SAME, AND METHOD OF STORING FULLERENE

TECHNICAL FIELD

The present invention relates to a container-enclosed fullerene, a method of manufacturing the same, and a method of storing fullerene.

BACKGROUND ART

Spherical carbons in which 60, 70, 76, 78, 82, or 84 carbon atoms are bonded in a spherical shape to form a cluster (molecular aggregate) are referred to as fullerenes. Fullerenes have drawn considerable attention as materials that have excellent functionalities, such as magnetic properties, superconducting properties, nonlinear optical effects, and catalysis.

When such fullerenes in a powdery state are left in the air, they will become insoluble in solvent in several days. By simply Ar-substituting the fullerenes, the components that are insoluble in solvent will increase in several days. When fullerenes are dissolved in an organic solvent as well, the insoluble components will be formed because of, for example, dissolved oxygen and moisture. In the case of solutions in which such fullerenes are dissolved in an organic solvent, the solutions need to be transported according to the handing for the organic solvent. Moreover, the fullerenes generally show a low solubility to solvent (e.g., several milligrams to several ten milligrams per milliliter), so a large amount of solvent is necessary in order to transport a certain amount of them in a solution form. For example, in order to dissolve 10 g of a fullerene that has a solubility of 1 mg/mL, 10 L of solvent is required.

Thus, a problem with the fullerene has been that storage thereof is difficult, and if the fullerene is stored without taking any measures, alteration occurs (one that has been soluble in solvent becomes insoluble). Another problem has been that although it may be stored in a solution, a large amount of solvent is necessary in that case due to poor solubility of the fullerene.

However, no storage method for fullerene that can prevent alteration of fullerene has been known to date. For example, publicly known literatures related to fullerenes describe that alteration of fullerene occurs because of oxygen and ultraviolet rays, but in reality, they do not mention any storage method. (See Patent Document 1 below.)

CITATION LIST

Patent Literature

[Patent Document 1] Japanese Published Unexamined Patent Application No. H07(1995)-138009

SUMMARY OF INVENTION

Technical Problem

In view of the problems, in the past, there has been a need for a storage method that can inhibit alteration of fullerene, particularly a storage method that prevent degradation of the solubility to solvent.

The present invention has been accomplished in view of the foregoing circumstances. It is an object of the invention to provide a container-enclosed fullerene, a method of manufacturing the same, and a method of storing fullerene are provided, that make it possible to inhibit alteration of fullerene, especially that make it possible to prevent degradation of the solubility to solvent.

Solution to Problem

In order to accomplish the foregoing object, the present invention provides a container-enclosed fullerene characterized in that fullerene is hermetically enclosed in a vacuum container.

By hermetically enclosing fullerene in a vacuum container, the fullerene can be inhibited from alteration, and in particular, the degradation of solubility to solvent can be prevented. The reason is believed to be that the impurities that cause deterioration of fullerene (i.e., the components that cause the fullerene to be insoluble in solvent), such as oxygen, are removed. As a result, stable long-term storage becomes possible. Moreover, the following significant advantageous effects are obtained. The need for the handling of solution and a large amount of solvent, which are required in the case where the fullerene is transported in a solution form, is eliminated. The volume corresponding to the solvent portion can be reduced. Thus, transportability and transport efficiency are improved.

Herein, the term "fullerene" is not particularly limited as long as the fullerene has a spherical shell structure, and is meant to include encapsulated fullerene, in which other elements such as a metal are encapsulated, organically modified fullerene, and empty fullerene that does not contain metal.

It is preferable that the internal pressure of the container be 10 Pa or lower. The reason is that when the internal pressure is 10 Pa or lower, the impurities that cause deterioration of fullerene (i.e., the components that cause the fullerene to be insoluble in solvent) can be sufficiently removed.

It is preferable that the fullerene be a metal encapsulated fullerene, in which a metal is encapsulated in a fullerene skeleton. Preferable examples of the metal atom of the metal encapsulated fullerene include: alkali metals, such as Li, Na, Rb, and Cs; alkaline-earth metals, such as Be, Mg, Ca, Sr, and Ba; and rare earth elements, such as Sc, Y, La, Ce, Pr, Nd, Pm, Sm, Eu, Gd, Tb, Dy, Ho, Er, Tm, Yb, and Lu. Particularly preferable are lanthanoids such as La, Ce, Pr, Nd, Pm, Sm, Eu, Gd, Tb, Dy, Ho, Er, Tm, Yb, and Lu. The metal encapsulated fullerene shows lower stability than ordinary fullerene. Therefore, the effect of inhibiting the alteration can be obtained more significantly.

In order to accomplished the foregoing object, the present invention also provides a method of manufacturing a container-enclosed fullerene, characterized by comprising: filling fullerene in a container; evacuating the container; and thereafter sealing the container.

This method makes it possible to easily manufacture a container-enclosed fullerene in which fullerene is hermetically enclosed in a vacuum container.

In order to accomplish the foregoing object, the present invention also provides a method of storing fullerene, characterized in that the fullerene is stored in vacuum. By storing fullerene in vacuum, alteration of fullerene can be inhibited, and stable long-term storage is made possible. The reason is believed to be that the impurities that cause deterioration of fullerene (i.e., the components that cause the fullerene to be insoluble in solvent) can be removed by making vacuum.

Advantageous Effects of Invention

The present invention makes it possible to inhibit alteration of fullerene by hermetically enclosing the fullerene in a vacuum container and in particular to prevent the degradation of solubility to solvent. The reason is believed to be that the impurities that cause deterioration of fullerene (i.e., the components that cause the fullerene to be insoluble in solvent), such as oxygen, are removed. As a result, stable long-term storage becomes possible. Moreover, the following significant advantageous effects are obtained. The need for the handling of solution according to the solvent used and a large amount of solvent, which are required in the case where the fullerene is transported in a solution form, is eliminated. The volume corresponding to the solvent portion can be reduced. Thus, transportability and transport efficiency are improved.

DESCRIPTION OF EMBODIMENTS

Hereinbelow, the present invention will be described based on the preferred embodiments. It should be noted that the present invention is not limited to the following embodiments.

(Structure of Container-Enclosed Fullerene According to the Present Invention)

A container-enclosed fullerene according to the present invention comprises fullerene hermetically enclosed in a glass tube having a high degree of vacuum. A glass tube is used as the container, but it is also possible to use a container made of other materials than glass. In particular, in order to improve the stability of the fullerene, it is preferable to use a container capable of shielding light. An example thereof is a container made of a light shielding glass. It is preferable that the internal pressure of the glass tube be 10 Pa or lower, more preferably 1 Pa or lower. The fullerene that is hermetically enclosed in the glass tube is not particularly limited as long as the fullerene has a spherical shell structure. However, preferable examples of the fullerene include metal encapsulated fullerene, organically modified fullerene, and empty fullerene that does not contain metal. Preferable examples of the metal atom of the metal encapsulated fullerene include: alkali metals, such as Li, Na, Rb, and Cs; alkaline-earth metals, such as Be, Mg, Ca, Sr, and Ba; and rare earth elements, such as Sc, Y, La, Ce, Pr, Nd, Pm, Sm, Eu, Gd, Tb, Dy, Ho, Er, Tm, Yb, and Lu. Particularly preferable are lanthanoids such as La, Ce, Pr, Nd, Pm, Sm, Eu, Gd, Tb, Dy, Ho, Er, Tm, Yb, and Lu.

(Manufacturing Method of Container-Enclosed Fullerene According to the Present Invention)

Figure 1:
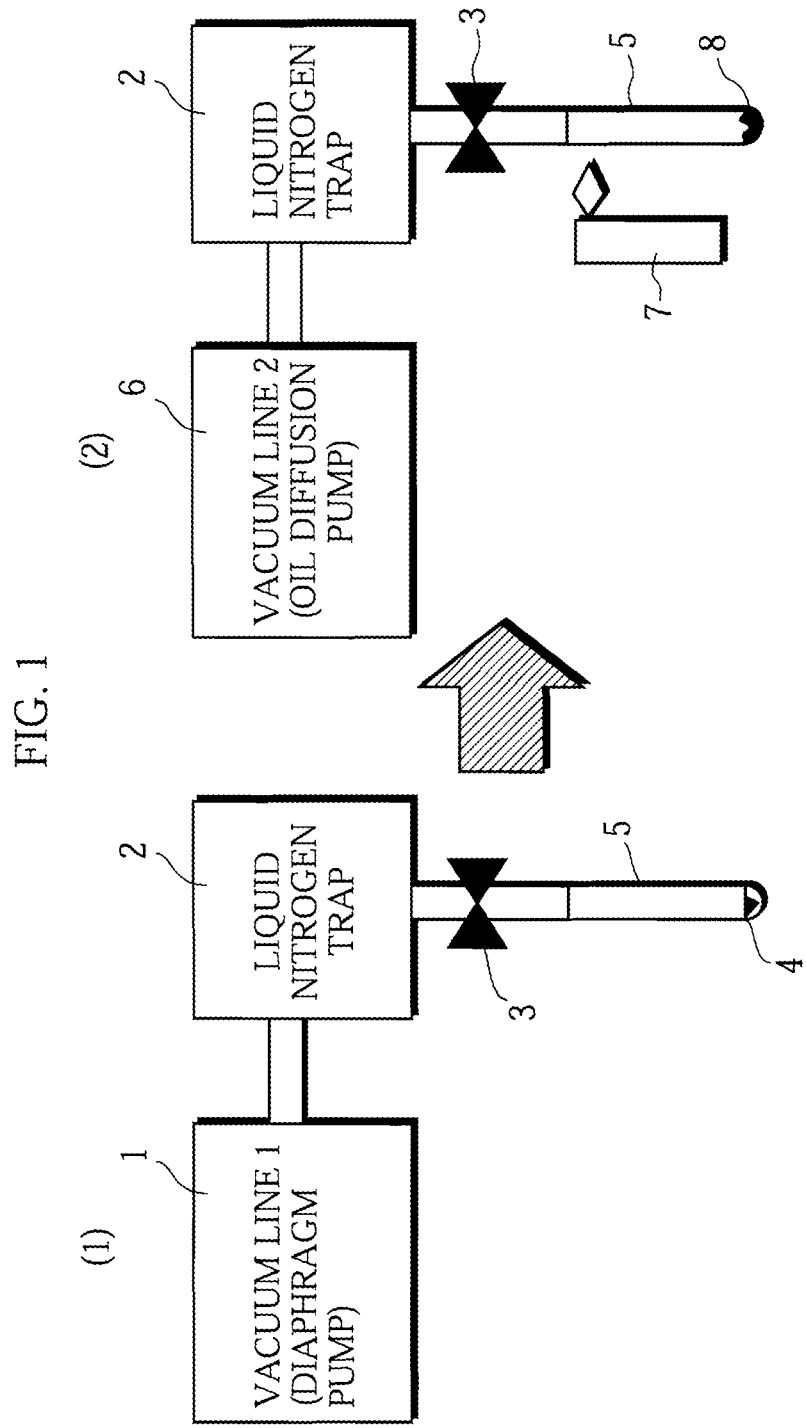
FIG. 1 shows diagrams for illustrating a method of manufacturing a container-enclosed fullerene according to the present invention.

FIG. 1 shows diagrams for illustrating a method of manufacturing a container-enclosed fullerene according to the present invention.

The container-enclosed fullerene according to the present invention is manufactured by filling fullerene in a container, evacuating the container, and thereafter sealing the container. Hereinbelow, the details are described with reference to FIG. 1. In FIG. 1, reference numeral 1 denotes a vacuum line comprising a diaphragm pump, reference numeral 2 denotes a liquid nitrogen trap, reference numeral 3 denotes a cock, reference numeral 4 denotes a fullerene solution, reference numeral 5 denotes a glass tube, reference numeral 6 denotes a vacuum line comprising an oil diffusion pump, reference numeral 7 denotes a burner, and reference numeral 8 denotes fullerene powder.

Here, a description will be made taking a metal encapsulated fullerene La@$C_{82}$, in which La is encapsulated in fullerene, as an example of the fullerene.

(1) The metal encapsulated fullerene La@$C_{82}$ is synthesized by an arc discharge method, and is collected by separating and purifying it. Specifically, a carbon electrode containing a metal or a metallic compound (a carbon electrode containing La) is used as a source material. The source material is caused to evaporate by an arc discharge between the electrodes, and the produced soot-like substance is collected. During this arc discharge, fullerenes are synthesized. Subsequently, fullerenes are extracted and separated from the soot-like substance obtained by an arc discharge method, using an organic solvent of aromatic hydrocarbon such as benzene and toluene, which can dissolve fullerenes relatively easily. The fullerenes separated in this way are further purified as necessary by chromatographic separation using a neutral alumina column or the like, so that a solution of the metal encapsulated fullerene La@$C_{82}$ is collected. This solution of the metal encapsulated fullerene La@$C_{82}$ is subjected to solvent exchange using carbon disulfide ($CS_2$). Carbon disulfide has a high solubility for the metal encapsulated fullerene La@$C_{82}$ and is therefore easy to handle.

(2) Subsequently, the carbon disulfide ($CS_2$) solution 4 of the metal encapsulated fullerene La@$C_{82}$ is put in a glass tube 5, and carbon disulfide is evaporated with a pressure of 0.02 MPa [FIG. 1(1)].

(3) Subsequently, after removing the solvent completely, the interior of the glass tube is evacuated to a degree of vacuum of $10^{-3}$ Pa. Then, while evacuating the glass tube 5, the glass tube 5 is sealed with a burner 7 [FIG. 1(2)], to prepare a glass tube-enclosed (container-enclosed) fullerene. It is preferable that the glass tube 5 be evacuated so that the internal pressure of the glass tube 5 becomes a degree of vacuum of 10 Pa or lower.

EXAMPLES

An experiment was conducted to determine the change over time of the amount of the metal encapsulated fullerene La@$C_{82}$ in solvent with varying form of storage. The results are shown in Table 1 and FIG. 2. Specifically, the following four kinds of forms of storage were tested: vacuum storage (Example), Ar substitution (Comparative Example 1), solution storage using ethanol (Comparative Example 2), and solution storage using acetone (Comparative Example 3).

TABLE 1

|  | Form of storage | Amount of dissolved fullerene | | Amount of dissolved fullerene | | Amount of dissolved fullerene |
| --- | --- | --- | --- | --- | --- | --- |
| Ex. 1 | Vacuum storage | 100 | → | 100 (after 13 days) | → | 93.8 (after 70 days) |
| Comp. Ex. 1 | Ar substitution | 100 | → | 79.8 (after 3 days) | → | 36.9 (after 16 days) |
| Comp. Ex. 2 | Ethanol solution storage | 100 | → | 29.7 (after 6 days) | → | |
| Comp. Ex. 3 | Acetone solution storage | 100 | → | 13.2 (after 8 days) | → | |

Example 1

Example 1 is the case of vacuum storage. A glass tube-enclosed (i.e., container-enclosed) fullerene using $La@C_{82}$ as fullerene was prepared in the same manufacturing method as described in the foregoing Description of Embodiments. Then, after 13 days and 70 days, respective powder samples were taken out, and the powders were dissolved in carbon disulfide. The carbon disulfide solutions were substituted by toluene, and the amounts of $La@C_{82}$ dissolved were determined by high-performance liquid chromatography. The amounts of $La@C_{82}$ thus obtained were compared to the amount before the storage.

Comparative Example 1

Comparative Example 1 is the case of Ar substitution. A carbon disulfide solution of $La@C_{82}$ that had been separated and purified was put into a vial, and an Ar gas was allowed to flow into the vial in the atmosphere, to cause the carbon disulfide to evaporate. After the solvent was evaporated, the lid of the vial was closed immediately. Then, after 3 days and 16 days, respective powder samples were taken out, and the powders were dissolved in carbon disulfide. The carbon disulfide solutions were substituted by toluene, and the amounts of $La@C_{82}$ dissolved were determined by high-performance liquid chromatography. The amounts of $La@C_{82}$ thus obtained were compared to the amount before the storage.

Comparative Example 2

Comparative Example 2 is the case of solution storage using ethanol. A carbon disulfide solution of $La@C_{82}$ that had been separated and purified was put into an evaporator to remove the solvent. After purging the inside of the evaporator with an Ar gas, ethanol was added to the $La@C_{82}$ powder, and the settled powder was stored in a vial together with the ethanol. Then, after 6 days, the ethanol was removed using an evaporator to take out powder sample, and the powder was dissolved in carbon disulfide. The carbon disulfide solution was substituted by toluene, and the amount of $La@C_{82}$ dissolved was determined by high-performance liquid chromatography. The amount of $La@C_{82}$ obtained was compared to the amount before the storage.

Comparative Example 3

Comparative Example 3 is the case of solution storage using acetone. A carbon disulfide solution of $La@C_{82}$ that had been separated and purified was put into an evaporator to remove the solvent. After purging the inside of the evaporator with an Ar gas, acetone was added to the $La@C_{82}$ powder, and the settled powder was stored in a vial together with the acetone. Then, after 8 days, the acetone was removed using an evaporator to take out powder sample, and the powder was dissolved in carbon disulfide. The carbon disulfide solution was substituted by toluene, and the amount of $La@C_{82}$ dissolved was determined by high-performance liquid chromatography. The amount of $La@C_{82}$ obtained was compared to the amount before the storage.

Figure 2:
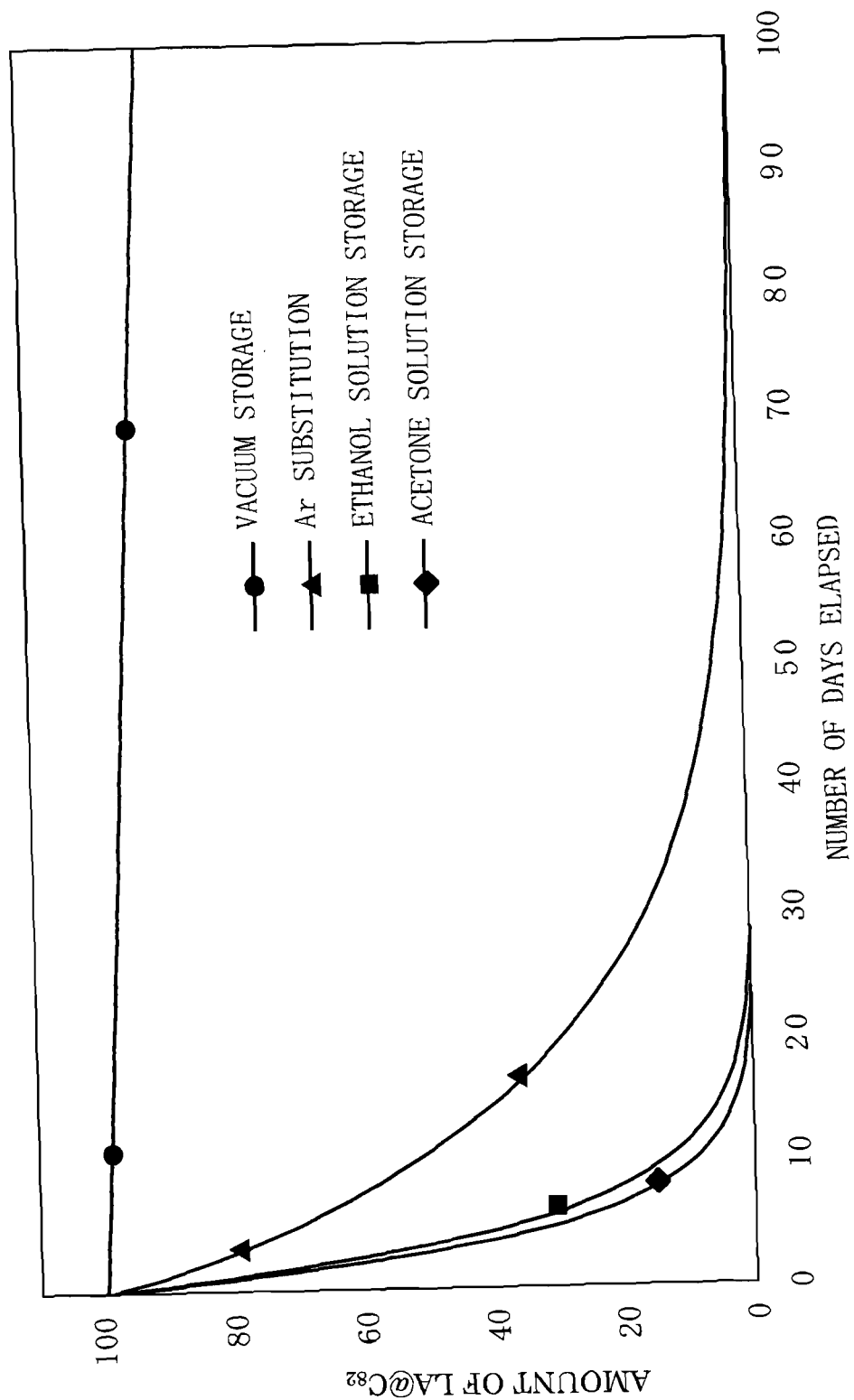
FIG. 2 is a graph illustrating changes over time of the amount of metal encapsulated fullerene La@$C_{82}$ that is soluble in solvent, with varying form of storage.

Analysis of the Results of the Experiment (1) The results shown in Table 1 and FIG. 2 demonstrate the following. In Comparative Example 1 (Ar substitution), the amounts of the dissolved fullerene after 3 days and 16 days were 79.8 and 36.9, respectively, when the amount of the dissolved fullerene before storage was taken as 100. In Comparative Example 2 (solution storage using ethanol), the amount of the dissolved fullerene after 6 days was 29.7 when the amount of the dissolved fullerene before storage was taken as 100. In Comparative Example 3 (solution storage using acetone), the amount of the dissolved fullerene after 8 days was 13.2 when the amount of the dissolved fullerene before storage was taken as 100. Thus, in all the comparative examples, it is observed that the amount of the dissolved fullerene decreases exponentially over time, and the changes over time are significant.

On the other hand, in Example 1 (vacuum storage), the amounts of the dissolved fullerene after 13 days and 70 days were 100 and 93.8, respectively, when the amount of the dissolved fullerene before storage was taken as 100, as seen from Table 1 and FIG. 2. Thus, in Example 1, it is observed that there is little change over time in the amount of the dissolved fullerene.

(2) The above-described results were believed to be obtained for the following reason. In the case of vacuum storage, the impurities that cause fullerene to deteriorate (i.e., the components that cause the fullerene to be insoluble in solvent), such as oxygen, are removed. Therefore, alteration of fullerene was inhibited.

In particular, the metal encapsulated fullerene, in which a metal is encapsulated in the fullerene skeleton, generally has low stability because of its structure. However, the stability of the metal encapsulated fullerene can be ensured in good condition by storing the fullerene in vacuum as described above.

INDUSTRIAL APPLICABILITY

The present invention is applicable to a container-enclosed fullerene, a method of manufacturing the same, and a method of storing fullerene that make it possible to inhibit alteration of fullerene, especially that make it possible to prevent degradation of the solubility to solvent.

REFERENCE SIGNS LIST

1—Vacuum line comprising diaphragm pump
2—Liquid nitrogen trap

3—Cock
4—Fullerene solution
5—Glass tube
6—Vacuum line comprising oil diffusion pump
7—Burner
8—Fullerene powder

The invention claimed is:

1. A container-enclosed fullerene, characterized in that fullerene, which comprises spherical carbons in which carbon atoms are bonded in a spherical shape, is hermetically enclosed in a vacuum container.

2. The container-enclosed fullerene according to claim 1, wherein the internal pressure of the container is 10 Pa or lower.

3. The container-enclosed fullerene according to claim 1, wherein the fullerene is a metal encapsulated fullerene.

4. The container-enclosed fullerene according to claim 2, wherein the fullerene is a metal encapsulated fullerene.

5. A method of manufacturing a container-enclosed fullerene, characterized by comprising: filling fullerene, which comprises spherical carbons in which carbon atoms are bonded in a spherical shape, in a container; evacuating the container; and thereafter sealing the container.

6. A method of storing fullerene, which comprises spherical carbons in which carbon atoms are bonded in a spherical shape, characterized in that the fullerene is stored in vacuum.

* * * * *